United States Patent
Chen et al.

(10) Patent No.: US 10,136,386 B2
(45) Date of Patent: *Nov. 20, 2018

(54) WIRELESS NETWORK DEVICE

(71) Applicant: NANNING FUGUI PRECISION INDUSTRIAL CO., LTD., Nanning (CN)

(72) Inventors: Hsing-Hsu Chen, New Taipei (TW); Shih-Chang Hsu, New Taipei (TW); Ming-Tsung Chen, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,510

(22) Filed: Oct. 17, 2017

(65) Prior Publication Data

US 2018/0192367 A1    Jul. 5, 2018

Related U.S. Application Data

(63) Continuation of application No. 15/394,673, filed on Dec. 29, 2016, now Pat. No. 9,826,477.

(51) Int. Cl.
*H04B 1/3883* (2015.01)
*H04W 52/02* (2009.01)
*H04Q 1/28* (2006.01)

(52) U.S. Cl.
CPC .......... *H04W 52/0206* (2013.01); *H04Q 1/28* (2013.01); *Y02D 70/122* (2018.01); *Y02D 70/126* (2018.01)

(58) Field of Classification Search
CPC ............................. H04W 52/0206; H04Q 1/28
USPC ........................................................... 455/572
See application file for complete search history.

(56) References Cited

U.S. PATENT DOCUMENTS

| | | | |
|---|---|---|---|
| 8,301,094 B2 * | 10/2012 | Ahn ....................... | H01Q 1/243 343/834 |
| 8,520,544 B2 * | 8/2013 | Aguirre ................... | H04L 41/12 370/241 |
| 8,830,081 B2 * | 9/2014 | Aguirre ..................... | G08B 5/36 340/539.21 |
| 9,826,477 B1 * | 11/2017 | Chen ................. | H04W 52/0206 |
| 2007/0106143 A1 * | 5/2007 | Flaherty ............. | A61B 5/04001 600/373 |
| 2010/0167672 A1 * | 7/2010 | Ahn ....................... | H01Q 1/243 455/132 |

(Continued)

*Primary Examiner* — Hai V Nguyen
(74) *Attorney, Agent, or Firm* — ScienBiziP, P.C.

(57) ABSTRACT

A wireless network device with a communication assembly, which is rotatable for better signal strength, includes a power supply module and the communication assembly. The communication assembly is powered by the power supply module. The power supply module includes a base and a first electrode unit. The first electrode unit is positioned in the base. The first electrode unit partially extends out of the base. The communication assembly includes a case and a second electrode unit. The second electrode unit is positioned in the case. The second electrode unit partially extends out of the case towards the first electrode unit. The case is detachably installed on the base. The case can be rotated relative to the base. The second electrode unit is electrically connected to the first electrode unit.

20 Claims, 5 Drawing Sheets

(56) References Cited

U.S. PATENT DOCUMENTS

| | | | |
|---|---|---|---|
| 2011/0143673 A1* | 6/2011 | Landesman | H01Q 1/1257 455/63.1 |
| 2012/0099428 A1* | 4/2012 | Kamdar | H04L 41/5022 370/235 |
| 2012/0242495 A1* | 9/2012 | Aguirre | G08B 5/36 340/815.45 |
| 2013/0136627 A1* | 5/2013 | Zhou | B05B 12/12 417/312 |
| 2017/0123045 A1* | 5/2017 | Shin | G01S 5/0081 |

\* cited by examiner

WIRELESS NETWORK DEVICE

FIELD

The subject matter relates to wireless communications, and particularly relates to a wireless network device.

BACKGROUND

Wireless communication is widespread. A communication assembly for receiving and/or transmitting wireless signals needs to be connected to a power module to obtain power. The communication assembly and the power module are generally connected through engagements of bumps and slots. However, the communication assembly cannot rotate relative to the power module when the two are engaged. In other words, an angle and direction of the communication assembly relative to the power module cannot be adjusted. As a result, the signal strength cannot be improved by adjusting the angle of the communication assembly when the signal is not good.

BRIEF DESCRIPTION OF THE DRAWINGS

Implementations of the present technology will now be described, by way of examples only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 1:
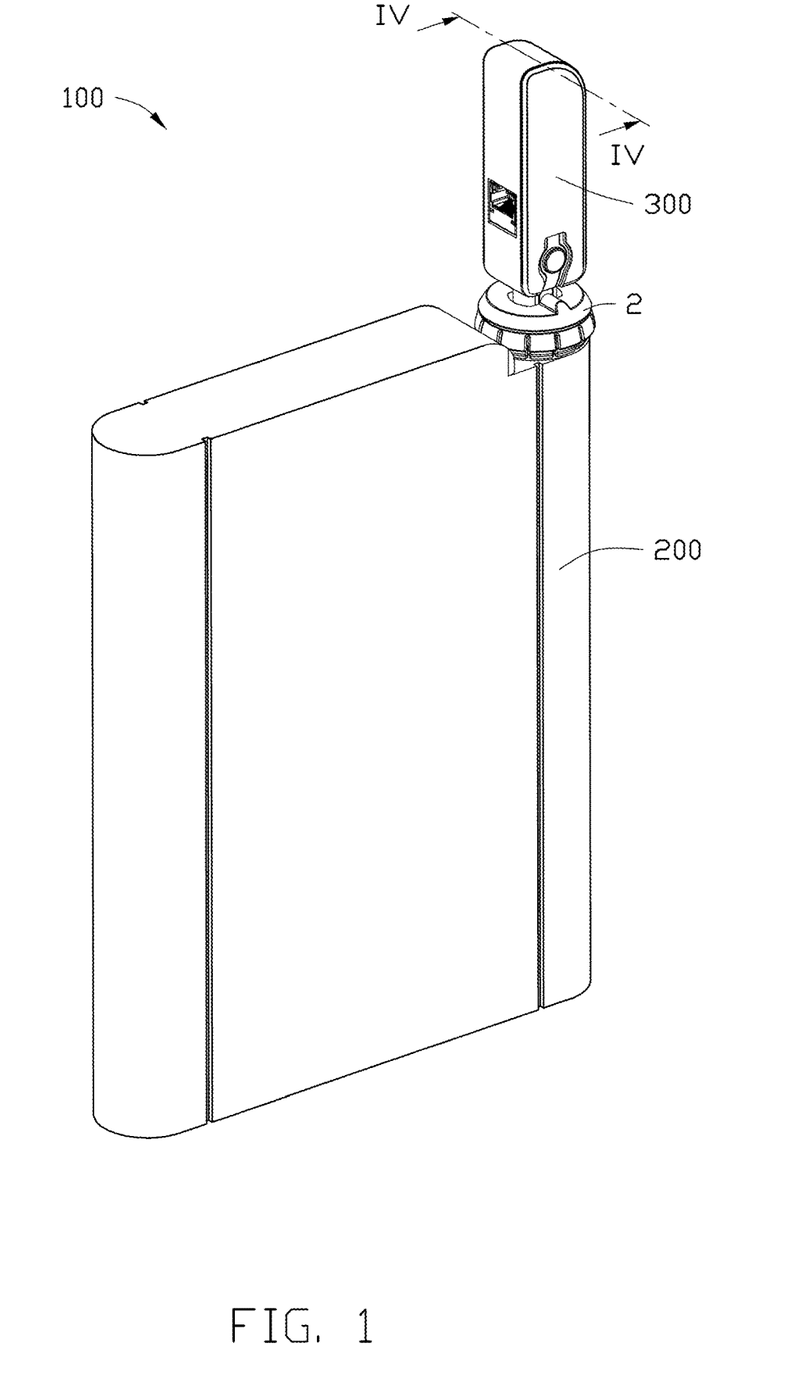
FIG. 1 is a schematic view of an exemplary embodiment of an assembled wireless network device.

Referring to FIG. 1, an exemplary wireless network device 100 includes a power supply module 200 and a communication assembly 300. The communication assembly 300 is detachably installed on the power supply module 200. The communication assembly 300 is electrically connected to the power supply module 200 to obtain power from the power supply module 200 to provide wireless communication. The communication assembly 300 can be rotated relative to the power supply module 200.

Figure 4:
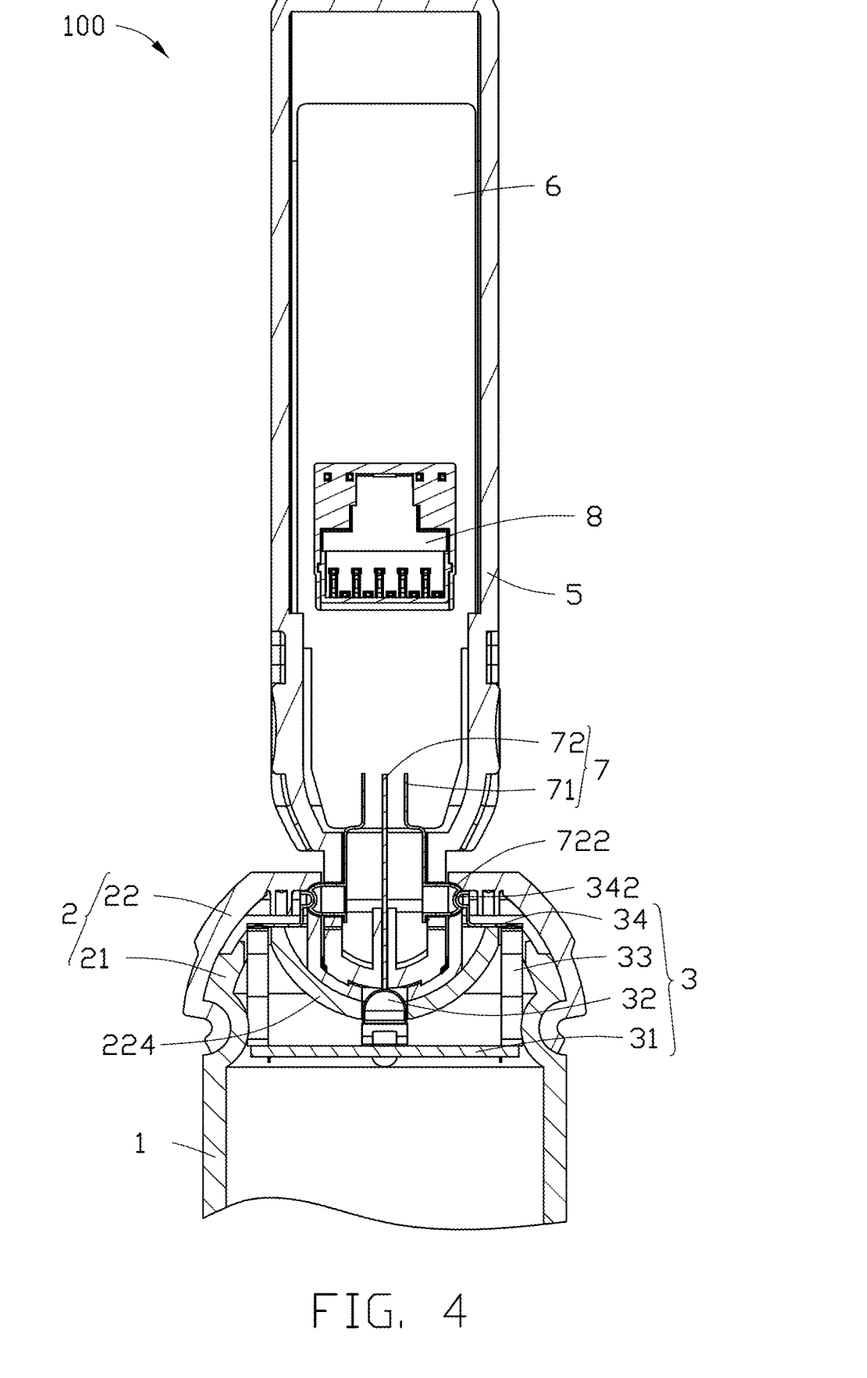
FIG. 4 is a cross-sectional view of the wireless network device in FIG. 1, taken along the line IV-IV.

Referring to FIG. 1 and FIG. 4, the exemplary power supply module 200 includes a base 2 and a first electrode unit 3. The first electrode unit 3 is positioned in the base 2. The first electrode unit 3 partially extends out of the base 2 towards the communication assembly 300. The communication assembly 300 includes a case 5 and a second electrode unit 7. The second electrode unit 7 is positioned in the case 5. The second electrode unit 7 partially extends out of the case 5 towards the power supply module 200. The second electrode unit 7 is electrically connected to the first electrode unit 3. The case 5 is detachably installed on the base 2. The case 5 can be rotated relative to the base 2.

Figure 2:
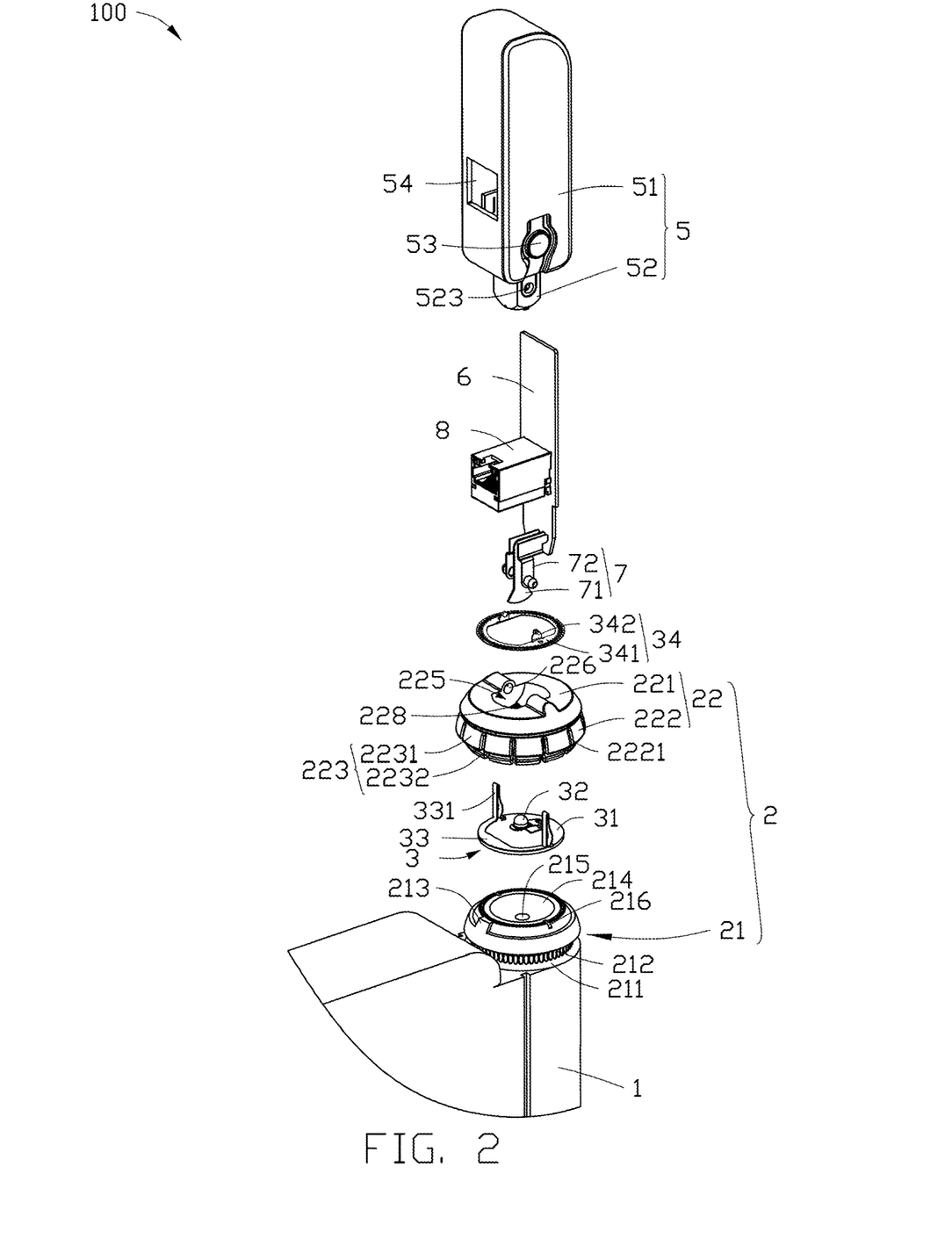
FIG. 2 is an exploded, isometric view of the wireless network device in FIG. 1.
Figure 3:
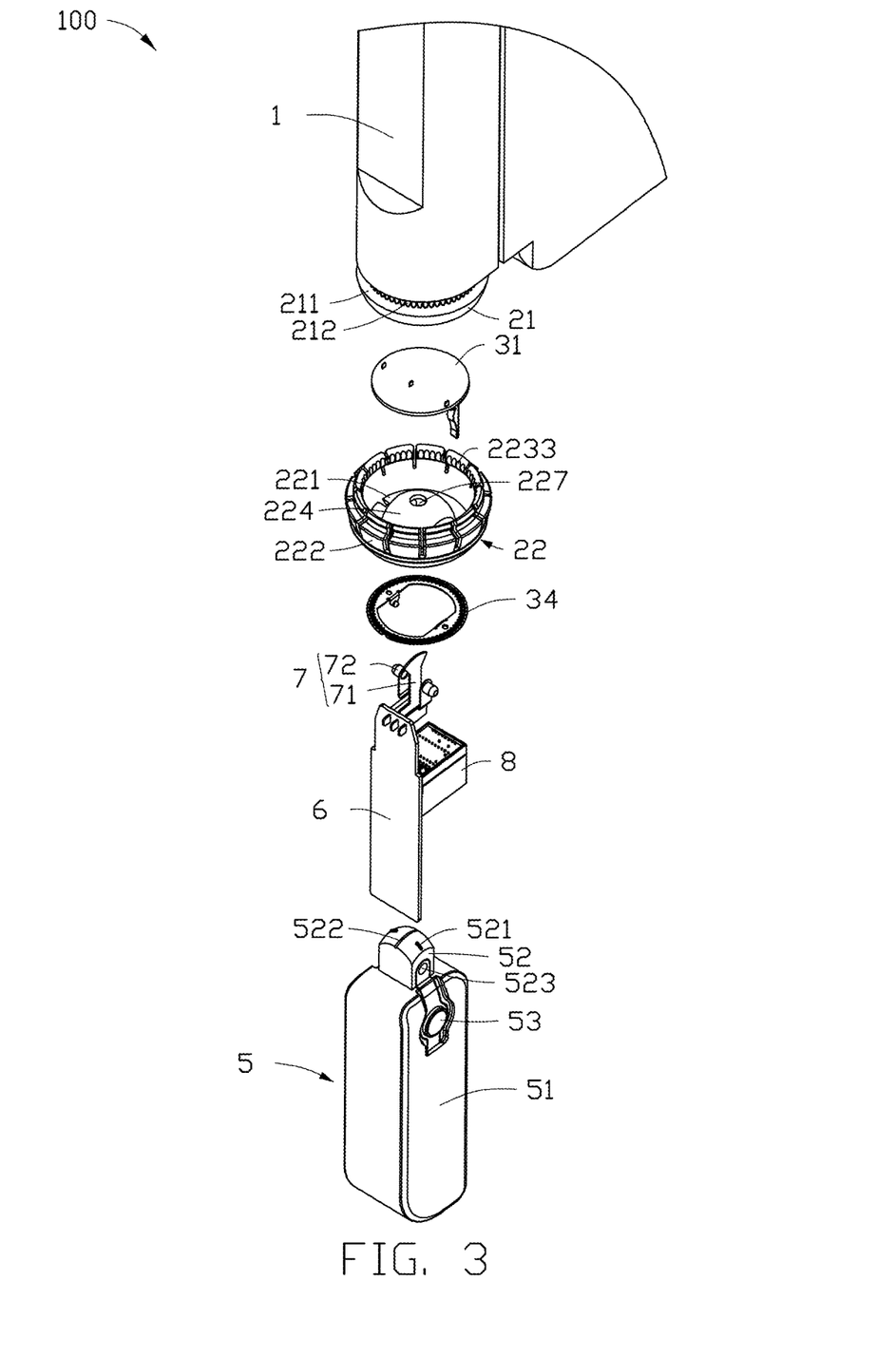
FIG. 3 is an exploded, isometric view of the wireless network device in FIG. 1 similar to FIG. 2, but viewed from another aspect.

Referring to FIG. 2 and FIG. 3, the exemplary power supply module 200 further includes a main body 1. The base 2 is positioned on the main body 1. The base 2 includes a fixed seat 21 and a rotating seat 22. The fixed seat 21 is positioned on the main body 1. The rotating seat 22 covers on the fixed seat 21. The rotating seat 22 can be rotated relative to the fixed seat 21. The rotating seat 22 and the fixed seat 21 are connected by snap structures.

The fixed seat 21 is substantially concave and in the shape of an upside-down bowl. A bottom of the bowl faces the rotating seat 22. A portion of the fixed seat 21 is received in the rotating seat 22. In the exemplary embodiment, the fixed seat 21 is integrated with the main body 1. In other exemplary embodiments, the fixed seat 21 may be detachably installed on the main body 1.

A slot 211 is defined on an end of the fixed seat 21. The slot 211 is adjacent to the main body 1. The slot 211 is recessed inwards from a periphery of the fixed seat 21. The slot 211 is substantially necking.

The rotating seat 22 includes a bottom board 221 and a sidewall 222. The sidewall 222 extends from a peripheral edge of the bottom board 221. The sidewall 222 is substantially a circular ring. The bottom board 221 and the sidewall 222 together substantially form an upside-down bowl. A bottom of the bowl faces the communication assembly 300. The case 5 is installed on the rotating seat 22. The case 5 can be rotated relative to the rotating seat 22. A free end of the sidewall 222 is substantially necking to fit with the slot 211. The free end of the sidewall 222 is engaged and latched in the slot 211.

In this exemplary embodiment, the sidewall 222 is evenly divided into a plurality of buckles 223 by a plurality of gaps 2221. Free ends of the buckles 223 together fit with the slot 211. Free ends of the buckles 223 are engaged and latched in the slot 211.

Each buckle 223 includes a locked part 2231 and a snap part 2232. The locked parts 2231 extend from the peripheral edge of the bottom board 221 towards the same side. Each snap part 2232 extends from an end of the locked part 2231.

The snap parts 2232 together fit with the slot 211. The snap parts 2232 are engaged and received in the slot 211 to connect the fixed seat 21 and the rotating seat 22.

The fixed seat 21 further includes a plurality of first convex structures 212. The first convex structures 212 are formed in the slot 211. The first convex structures 212 are uniformly distributed around a bottom surface of the slot 211. Correspondingly, the rotating seat 22 further includes a plurality of second convex structures 2233. The second convex structures 2233 are formed on an inner surface of each snap part 2232. The second convex structures 2233 are engaged with the first convex structures 212 to increase a degree of adhesion of the rotating seat 22 and the fixed seat 21.

The fixed seat 21 further includes at least one latch 213. The latch 213 is formed on a side surface of the fixed seat 21. The latch 213 is adjacent to an end of the fixed seat 21. The latch 213 is adjacent to the main body 1. When the snap parts 2232 are received in the slot 211, one of the locked parts 2231 faces the latch 213. The locked part 2231 facing the latch 213 can be elastically deformed. When the rotating seat 22 is rotated relative to the fixed seat 21 under an external force, the latch 213 serves to limit a rotation angle of the rotating seat 22. Thus, internal wirings (not shown) are not strained due to excessive rotation angle.

The rotating seat 22 further includes a convex portion 224. The convex portion 224 is convex from a center portion of the bottom board 221 towards to the fixed seat 21. Correspondingly, a cavity 214 is defined on the fixed seat 21 to receive the convex portion 224. In this exemplary embodiment, the convex portion 224 is substantially hemispherical. The case 5 is installed on the convex portion 224. A chamber 225 is defined on the convex portion 224. The case 5 is partially received in the chamber 225.

The first electrode unit 3 is positioned between the base 2 and the main body 1. The first electrode unit 3 includes a supporting plate 31, a positive pole 32, a negative pole 33, and a conductive member 34. The positive pole 32 and the negative pole 33 are fixed on the supporting plate 31. The supporting plate 31, the positive pole 32, and the negative pole 33 are received in the supporting plate 31. The conductive member 34 is fixed and received in the rotating seat 22. The conductive member 34 serves to connect the negative pole 33 and the second electrode unit 7.

The supporting plate 31 is fixed on a structural member (not shown) of the main body 1. In this exemplary embodiment, the supporting plate 31 is substantially circular. The positive pole 32 and the negative pole 33 are arranged on the same side of the supporting plate 31. The positive pole 32 and the negative pole 33 are apart from each other. The positive pole 32 and the negative pole 33 partially extend out of the fixed seat 21. Correspondingly, through holes are defined on the fixed seat 21 to expose the positive pole 32 and the negative pole 33. The through holes face the rotating seat 22. In this exemplary embodiment, the negative pole 33 includes two contact pins 331. A first through hole 215 and two second through holes 216 are defined to expose the positive pole 32 and the two contact pins 331 of the negative pole 33.

The conductive member 34 is positioned between the rotating seat 22 and the fixed seat 21. The conductive member 34 is fixed on an inner surface of the bottom board 221. In this exemplary embodiment, the conductive member 34 includes a first conductive part 341 and two second conductive parts 342. The first conductive part 341 is substantially a circular ring. The first conductive part 341 is electrically connected to the negative pole 33. Each second conductive part 342 extends from a side of the first conductive part 341. The two second conductive parts 342 are positioned on the same side of the first conductive part 341. The two second conductive parts 342 are opposite and away from each other. The two second conductive parts 342 are connected to the second electrode unit 7.

Correspondingly, two shaft holes 226 are defined on the rotating seat 22. The two second conductive parts 342 are partially positioned in the two shaft holes 226. The two shaft holes 226 serve to expose the two second conductive parts 342, so that the second conductive parts 342 can electrically connect to the second electrode unit 7. Correspondingly, a third through hole 227 is defined on the rotating seat 22 to expose the positive pole 32, so that the positive pole 32 can electrically connect to the second electrode unit 7. In this exemplary embodiment, the third through hole 227 is defined on a center portion of a bottom of the convex portion 224.

The communication assembly 300 further includes a circuit board 6. The second electrode unit 7 is fixed on the circuit board 6. The circuit board 6 is received in the case 5. The case 5 includes a receiving part 51 and a docking part 52. The receiving part 51 is hollow. The receiving part 51 serves to receive the circuit board 6 and electronic elements (not shown) arranged on the circuit board 6. The docking part 52 is positioned on an end of the receiving part 51. The docking part 52 is hollow. The docking part 52 communicates with the receiving part 51. The second electrode unit 7 is partially received in the docking part 52. The docking part 52 is installed on the convex portion 224 of the rotating seat 22. The docking part 52 is received in the chamber 225. The docking part 52 can be rotated relative to the rotating seat 22. In this exemplary embodiment, an end surface of the docking part 52 is substantially spherical.

The docking part 52 further includes at least a lug 521. The lug 521 is formed on the end surface of the docking part 52, as shown in FIG. 3. At least one third convex structure 228 is formed on the convex portion 224, as shown in FIG. 2. When the docking part 52 is rotated relative to the convex portion 224, the lug 521 is engaged with the third convex structure 228, to increase the closeness of connection between the docking part 52 and the rotating seat 22. In this exemplary embodiment, the docking part 52 includes two lugs 521.

Referring to FIG. 2 and FIG. 3, the second electrode unit 7 is fixed on an end of the circuit board 6 which is adjacent to the docking part 52. The second electrode unit 7 includes a first electrode 71 and two second electrodes 72. The first electrode 71 is apart from each of the two second electrodes 72. The two second electrodes 72 are positioned at two sides of the first electrode 71. The first electrode 71 partially extends out of the docking part 52 to electronically connect to the positive pole 32. The two second electrodes 72 partially extend out of the docking part 52 to electronically connect to the two second conductive parts 342.

A first breach 522 and two second breaches 523 are defined on the docking part 52 to respectively expose the first electrode 71 and the two second electrodes 72. The first breach 522 is defined on an end surface of the docking part 52. The two second breaches 523 are defined on two side surfaces of the docking part 52. The two side surfaces are opposite and away from each other. The first electrode 71 extends out of the case 5 through the first breach 522. The two second electrodes 72 respectively extend out of the case 5 through the two second breaches 523. When the communication assembly 300 is installed on the power supply module 200, the two second electrodes 72 are partially received in the two shaft holes 226. The two second electrodes 72 are electronically engaged with the two second conductive parts 342. The communication assembly 300 can be freely rotated relative to the power supply module 200, with the two second electrodes 72 acting as an axis.

The case 5 further includes at least a button 53. The button 53 is positioned on the receiving part 51 and is adjacent to the docking part 52. The button 53 faces one of the second electrodes 72. In other words, the second electrode 72 is located at an inner side of the button 53. When the button 53 is pressed, the second electrode 72 has an elastic deformation and is forced back into the docking part 52, resulting in convenience of assembly and disassembly.

The communication assembly 300 further includes a network interface 8. The network interface 8 is fixed on the circuit board 6. The network interface 8 is received in the case 5. An opening 54 is defined on the case 5 to expose the network interface 8. The network interface 8 serves to connect with a wired network.

Figure 5:
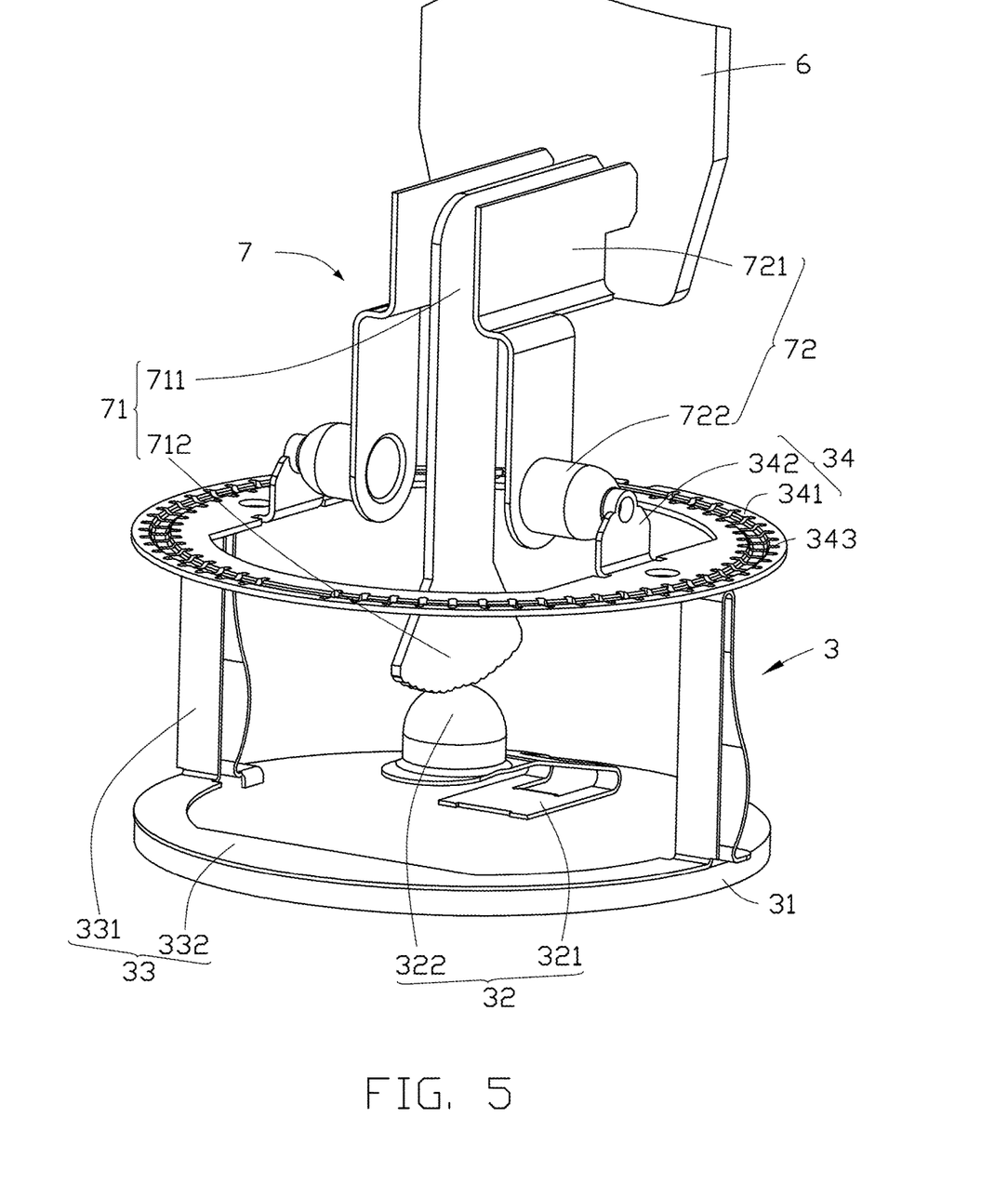
FIG. 5 is an assembly schematic view of an exemplary embodiment of a first electrode unit and a second electrode unit of the wireless network device in FIG. 1.

FIG. 5 shows details of the first electrode unit 3, the second electrode unit 7, and the connection between the first electrode unit 3 and the second electrode unit 7.

Referring to FIG. 5, the positive pole 32 is positioned on a center of the supporting plate 31. The positive pole 32 includes an elastic portion 321 and a contact point 322. The contact point 322 is positioned on the elastic portion 321. The elastic portion 321 includes a combination of two side springs. One of the two side springs is straight, and the other one of the two side springs has a wave-like shape. When the first electrode 71 is rotated along with the communication assembly 300 relative to the power supply module 200, the elastic portion 321 will be returned to its original position under an elastic force of the contact point 322, thereby avoiding poor contact between the elastic portion 321 and the first electrode 71.

The negative pole 33 is positioned on a peripheral edge of the supporting plate 31. The negative pole 33 further includes a connecting portion 332. The connecting portion 332 connects the two contact pins 331. The connecting portion 332 is substantially semicircular. The connecting portion 332 is attached on a side of the supporting plate 31. The two contact pins 331 are perpendicular to the connecting portion 332. The two contact pins 331 are fixed on the supporting plate 31. Each contact pin 331 is a combination of two side springs. One of the two side springs is straight, and the other one of the two side springs has a wave-like shape. When the conductive member 34 is rotated along with the rotating seat 22 relative to the fixed seat 21, the contact pin 331 will be returned to its original position under an elastic force, therefore avoiding poor contact of the contact pin 331 and the second conductive part 342.

A plurality of grooves 343 is defined on the first conductive part 341. Each groove 343 extends in a radial direction. The grooves 343 are arranged in a ring on the first conductive part 341. Each contact pin 331 of the negative pole 33 is partially embedded into one of the grooves 343. When the rotating seat 22 is rotated, the first conductive part 341 is accordingly rotated, and the contact pins 331 slide on the first conductive part 341 until entering into the grooves 343. In this exemplary embodiment, an annular portion of the first conductive part 341 which the grooves 343 define is convex towards the negative pole 33, thereby increasing contact area and contact stability of the contact pin 331 and the groove 343.

The first electrode 71 is a metallic plate. The first electrode 71 includes a fixing end portion 711 and a contact end portion 712. The fixing end portion 711 and the contact end portion 712 are opposite and away from each other. The fixing end portion 711 is fixed on the circuit board 6. The contact end portion 712 faces the positive pole 32, and the contact end portion 712 is electronically connected to the positive pole 32. In this exemplary embodiment, an end surface of the contact end portion 712 is arced. In this exemplary embodiment, microstructures are formed on the end surface of the contact end portion 712. The microstructures serve to promote and increase contact with the positive pole 32.

Each second electrode 72 includes a fixing part 721 and a contact part 722. The fixing part 721 is fixed on the circuit board 6. The contact part 722 is positioned on a side of the fixing part 721. The two contact parts 722 are located at the two sides of the first electrode 71. The two contact parts 722 are opposite and away from each other. The two contact parts 722 are electronically connected to the two second conductive parts 342.

Referring to FIG. 2 and FIG. 4, the exemplary wireless network device 100 of the present disclosure is assembled as follows:

The button 53 is pressed and the docking part 52 of the case 5 is inserted into the convex portion 224 of the rotating seat 22.

The button 53 is released to let the contact parts 722 of the two second electrodes 72 sink into the two shaft holes 226 and connect to the two second conductive parts 342.

When the signal is poor, an angle of the communication assembly 300 relative to the power supply module 200 can be adjusted by swinging the case 5 and/or rotating the rotating seat 22.

The embodiments shown and described above are only examples. Many details are often found in the art such as the other features of wireless network device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A wireless network device comprising:
   a power supply module comprising:
      a base; and
      a first electrode unit positioned in the base, wherein a portion of the first electrode unit extends out of the base;
   a communication assembly powered by the power supply module, the communication assembly comprising:
      a second electrode unit;
   wherein the second electrode unit is electrically connected to the first electrode unit, and the communication assembly is rotatable relative to the power supply module.

2. The wireless network device of claim 1, wherein the base comprises:
   a fixed seat; and
   a rotating seat covering the fixed seat;
   wherein the rotating seat is rotatable relative to the fixed seat;

wherein the power supply module further comprises a case, and wherein the case is detachably installed on the rotating seat, and the case is rotatable relative to the rotating seat.

3. The wireless network device of claim 2, wherein the second electrode unit comprises a first electrode and two second electrodes; the first electrode unit comprises a positive pole, a negative pole, and a conductive member; and wherein the positive pole is electronically connected to the first electrode; and the negative pole is electronically connected to the two second electrodes by the conductive member.

4. The wireless network device of claim 3, wherein the first electrode unit further comprises a supporting plate; the positive pole and the negative pole are fixed on the supporting plate; and wherein the positive pole, the negative pole, and the supporting plate are together received in the fixed seat; the positive pole passes through the fixed seat and the rotating seat to electrically connect the first electrode.

5. The wireless network device of claim 4, wherein the conductive member is fixed and positioned in the rotating seat; and the conductive member comprises a first conductive part and two second conductive parts; and wherein the negative pole passes through the fixed seat to electrically connect the first conductive part; and the two second conductive parts pass through the rotating seat to electronically connect the two second electrodes.

6. The wireless network device of claim 5, wherein two shaft holes are defined on the rotating seat; the two shaft holes face each other; and wherein the two second conductive parts are positioned in the two shaft holes; and the two second electrodes sink into the two shaft holes to electronically connect the two second conductive parts.

7. The wireless network device of claim 2, wherein a slot is defined on the fixed seat; and the slot is a necking; and wherein the rotating seat comprises a bottom board and a sidewall; the sidewall extends from a peripheral edge of the bottom board; and wherein a free end of the rotating seat is necking to fit with the slot, the free end of the sidewall is engaged and latched in the slot.

8. The wireless network device of claim 7, wherein the sidewall is evenly divided into a plurality of buckles by a plurality of gaps; and free ends of the buckles together fit with the slot.

9. The wireless network device of claim 8, wherein each buckle comprises a locked part and a snap part; the locked parts extend from the peripheral edge of the bottom board towards a same side; and each snap part extends from an end of a corresponding locked part; and wherein the snap parts together fit with the slot; and the snap parts are engaged and latched in the slot to connect the rotating seat to the fixed seat.

10. The wireless network device of claim 9, wherein the fixed seat further comprises at least one latch; the at least one latch is formed on a side surface of the fixed seat; and wherein when the snap parts are received in the slot, one of the locked parts faces the at least one latch; and the locked part facing the at least one latch is elastically deformed.

11. The wireless network device of claim 9, wherein the fixed seat further comprises a plurality of first convex structures; and the first convex structures are formed in the slot;

wherein the rotating seat further comprises a plurality of second convex structures; and the second convex structures are formed on an inner surface of each snap part;

wherein the second convex structures are engaged with the first convex structures to increase a degree of adhesion of the rotating seat and the fixed seat.

12. The wireless network device of claim 7, wherein the fixed seat further comprises a plurality of first convex structures; and the first convex structures are formed in the slot;

wherein the rotating seat further comprises a plurality of second convex structures; and the second convex structures are formed on an inner surface of the sidewall;

wherein the second convex structures are engaged with the first convex structures to increase a degree of adhesion of the rotating seat and the fixed seat.

13. The wireless network device of claim 3, wherein the positive pole comprises an elastic portion and a contact point; the contact point is positioned on the elastic portion; and wherein the elastic portion is a combination of two side springs; one of the two side springs is straight, and the other one of the two side springs has a wave-like shape.

14. The wireless network device of claim 5, wherein the negative pole further comprises two contact pins and a connecting portion; the connecting portion connects the two contact pins; and the two contact pins are perpendicular to the connecting portion; and wherein each contact pin is a combination of two side springs; one of the two side springs is straight, and the other one of the two side springs has a wave-like shape.

15. The wireless network device of claim 14, wherein a plurality of grooves is defined on the first conductive part; and each groove extends in a radial direction; and wherein each contact pin is partially embedded into one of the grooves.

16. The wireless network device of claim 15, wherein the grooves are arranged in a ring on the first conductive part; and an annular portion of the first conductive pail which the grooves define is convex towards the negative pole.

17. The wireless network device of claim 15, wherein the first electrode comprises a contact end portion, the contact end portion faces the positive pole; and the contact end portion electrically connects the positive pole; and wherein an end surface of the contact end portion is arced; and microstructures are formed on the end surface of the contact end portion.

18. A wireless network device comprising:

a power supply module comprising a first electrode unit; and a communication assembly powered by the power supply module, the communication assembly comprising a second electrode unit electrically connected to the first electrode unit;

wherein the second electrode unit is rotatable relative to the first electrode unit to improve signal reception.

19. The wireless network device of claim 18, wherein the power supply module further comprising:
a fixed seat; and
a rotating seat covering on the fixed seat;
wherein the first electrode unit positioned in the fixed seat and the rotating seat, the communication assembly installed on the rotating seat, and the rotating seat is rotatable relative to the fixed seat;
wherein the first electrode unit comprising a positive pole, a second pole and a conductive member; and
wherein the positive pole and the second pole are positioned in the fixed seat; and the conductive member is positioned in the rotating seat.

20. The wireless network device of claim 19,
wherein a portion of the positive pole extends out of the fixed seat and the rotating seat to electrically connect to the second electrode unit; and
wherein a portion of the negative pole extends out of the fixed seat to electrically connect to the conductive member; and a portion of the conductive member extends out of the rotating seat to electrically connect to the second electrode unit.

\* \* \* \* \*